Figure 1:
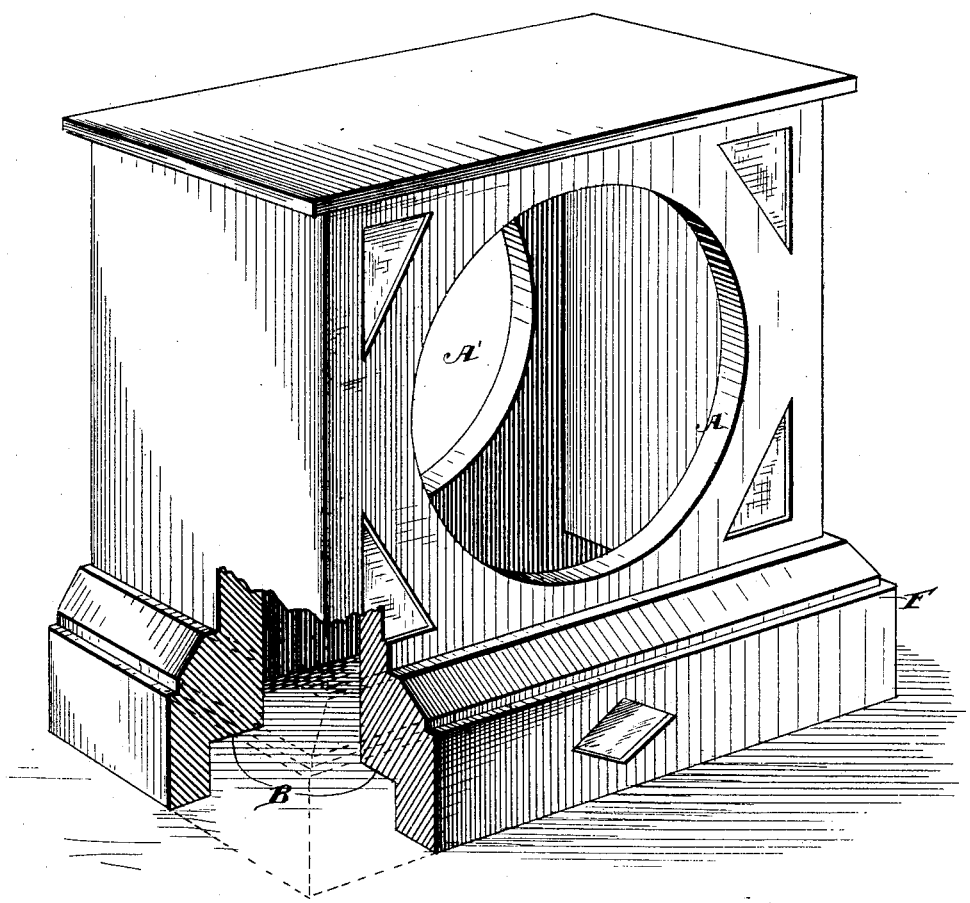

(Model.)

3 Sheets—Sheet 1.

R. P. COUGHLIN.

MANUFACTURE OF CLOCK CASES, STATUARY, VASES, AND OTHER ARTICLES FROM PLASTIC MATERIALS.

No. 311,875.　　　　　　　　　　Patented Feb. 10, 1885.

Witnesses,
Robert Everett,
Jo. L. Coombs

Inventor,
Reese P. Coughlin,
James L. Norris

N. PETERS. Photo-Lithographer, Washington, D. C.

(Model.) 3 Sheets—Sheet 2.
R. P. COUGHLIN.
MANUFACTURE OF CLOCK CASES, STATUARY, VASES, AND OTHER ARTICLES FROM PLASTIC MATERIALS.
No. 311,875. Patented Feb. 10, 1885.
Fig. 2.
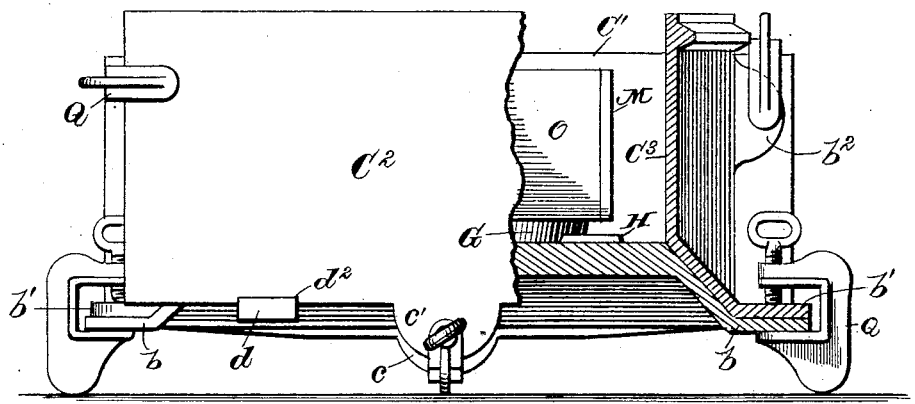
Fig. 5.
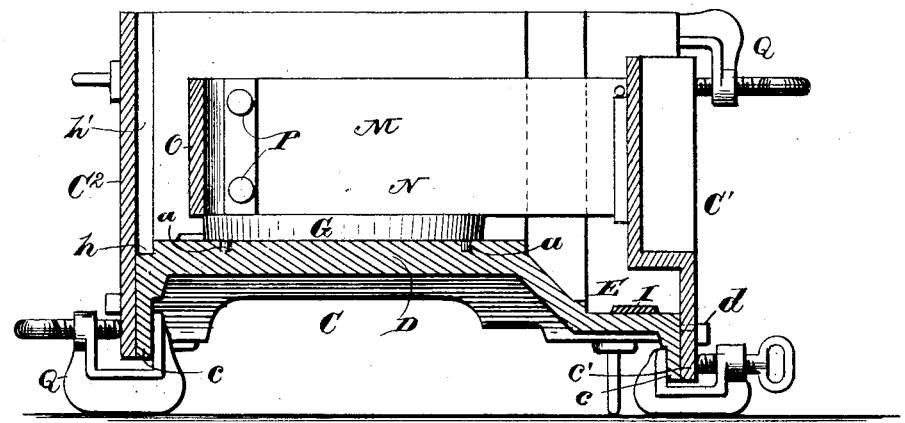
Fig. 6.
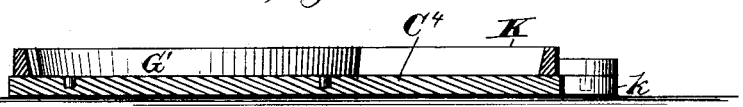
Witnesses, Fig. 7. Inventor.
Robt. Everett,  Reese P. Coughlin,
Jo. L. Coombs. By James L. Norris.
Atty.

(Model.)
3 Sheets—Sheet 3.
R. P. COUGHLIN.
MANUFACTURE OF CLOCK CASES, STATUARY, VASES, AND OTHER ARTICLES FROM PLASTIC MATERIALS.
No. 311,875. Patented Feb. 10, 1885.
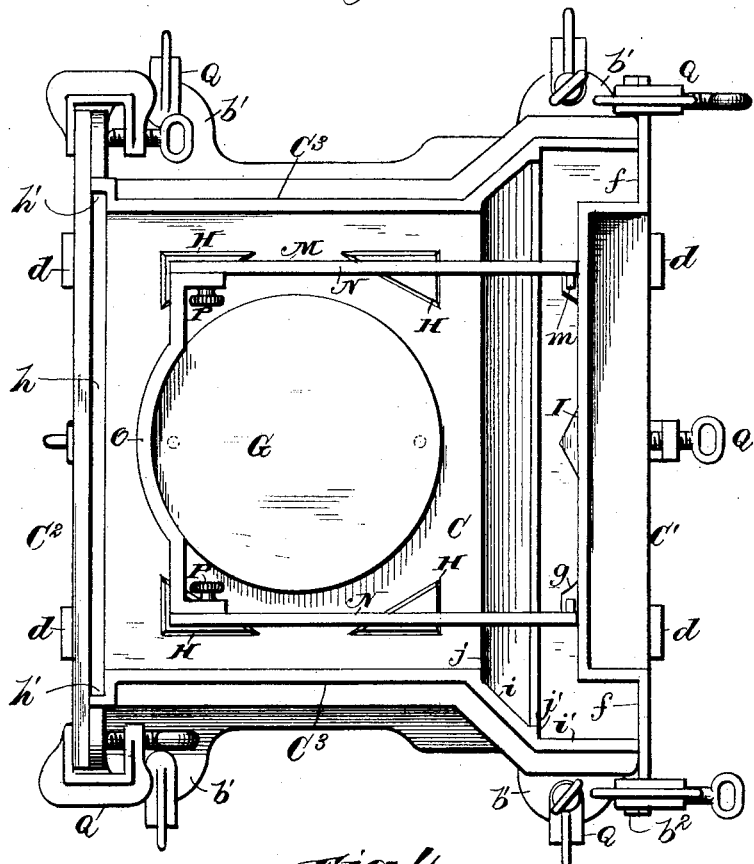
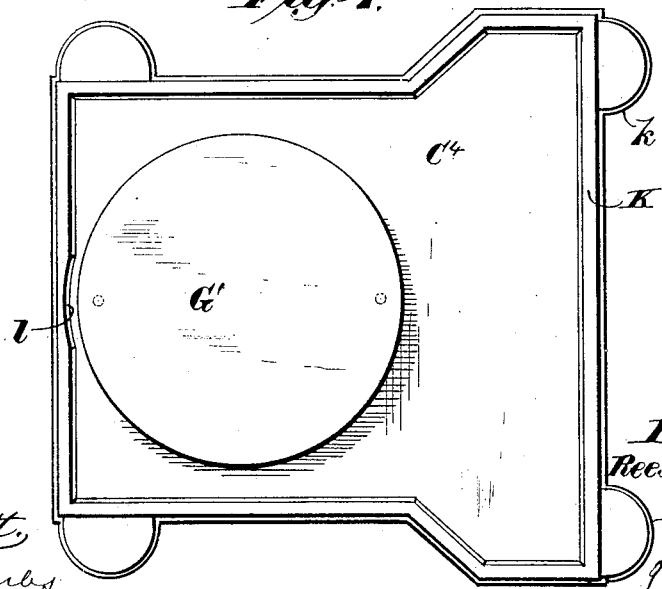
Witnesses,
Robt Eratt,
Jo. L. Coombs.
Inventor:
Reese P. Coughlin.
By
James L. Norris
Atty.

UNITED STATES PATENT OFFICE.

REESE P. COUGHLIN, OF CINCINNATI, OHIO.

MANUFACTURE OF CLOCK-CASES, STATUARY, VASES, AND OTHER ARTICLES FROM PLASTIC MATERIALS.

SPECIFICATION forming part of Letters Patent No. 311,875, dated February 10, 1885.

Application filed June 24, 1884. (Model.)

*To all whom it may concern:*

Be it known that I, REESE P. COUGHLIN, a citizen of the United States, residing at Cincinnati, Ohio, have invented new and useful Improvements in Manufacture of Clock-Cases, Statuary, Vases, and other Articles from Plastic Materials, of which the following is a specification.

My invention relates to the manufacture of clock-cases and other articles, and has for its object to produce a case or other article cheap of manufacture, strong and durable in its use, susceptible of a high finish; and to those ends it consists of a clock-case or other article made of the composition hereinafter particularly described. It also consists in the method and the mold for making the same, as will be hereinafter particularly set forth.

In the drawings, Figure 1 is a perspective view of the clock-case with part broken away to show the formation of the sounding-board space; Fig. 2, an end elevation of the mold, partly in section; Fig. 3, a plan view of the same; Fig. 4, a plan view of the back plate of the mold; Fig. 5, a central vertical section through the mold; Fig. 6, a longitudinal section through the back plate; Fig. 7, a detail view of one of the detachable patterns.

The composition of which the case is made consists of "Keene's cement," which may be such, for instance, as is manufactured by J. B. White & Bros., England, to which is added water, alum, and rosin.

In forming the composition, there is first formed a mixture of water, two gallons, alum, one pound, and rosin, one pound. After the alum and rosin are dissolved there is added to the mixture Keene's cement until the mass is about the consistency of flour paste, or such consistency as will permit coloring-matter to be thoroughly incorporated and diffused throughout the same, the cement having been first ground to reduce it to a fine powder, the finer the better. Then the coloring-matter—for instance, English or ivory drop black—is added in quantities sufficient to impart the desired shade, say, in the proportions of about one pound of the black to ten pounds of the cement. Afterward more of the cement is added, and the parts continued to be thoroughly mixed until the mass is about the consistency of tempered potter's clay. Instead of alum, either Glauber's salt or Epsom salts, or sulphate of manganese, or any two or all of these ingredients may be used in the composition. This composition can be used to form the whole body of the case, or to form only a facing thereto, which latter is preferred, as it answers the purpose admirably and lessens the expense of manufacture. When it is used only as a facing, the facing or backing will preferably be composed of a composition of one part of the cement to one part of coarse sand added to the mixture made as described for the facing, the proportions of the ingredients being the same or thereabout. After the case is removed from the mold the imperfections in the face, if there be any, are filled with the same composition as that composing the face, and the surface is then honed down smooth with a hone or by any other suitable means. Then the case is dipped in a dye composed preferably of extract of logwood, five pounds, copperas, one pound, and tincture of iron, half-pint, the whole boiled in about twenty-five gallons of water until the ingredients are dissolved and mixed. The case is dipped in the dye preferably while the latter is hot, and may be permitted to remain therein for fifteen minutes, more or less, or long enough to color whatever light specks may be seen in the composition after the honing process. After the case is taken out of the dye and dried it is then subjected to any of the well-known polishing manipulations to impart to its surface a fine glossy facing.

The case may be of any desired pattern, and may be ornamented in any tasteful design by mosaic work set into recesses or interstices made therefor in the process of molding or otherwise.

The case shown in Fig. 1 of the drawings is an illustration of the "French" form of case, and is formed with openings A A', adapted to receive the clock mechanism in the same manner as in the French case, and is also formed with the recess B in its base for the sounding-board.

The mold used in casting the case is preferably made of brass, although it may be made of other suitable material, and an illustration of the preferred construction is shown in the accompanying drawings, and will now be particularly described.

The letter C designates what will be termed the "face-plate," which is made with a raised central bed, D, to form a lower depression, E, which will mold the lower front molding, F, of the case.

On the bed D there will be secured by dowel-pins $a$ a circular pattern, G, to mold the opening A, and also, by same means, patterns H, for molding depressions to receive ornamental mosaic designs, while patterns I, for the same purpose, may be likewise secured to the face of the depression E. A recess, $h$, will be made along the upper edge of the plate to form the front projecting edge of the top of the case.

The face-plate on the outside at opposite corners will be formed with angular lugs $b$, extending from two opposite edges, while the other two edges will be formed with lugs $c$ and lips $d$, and along the same edges may be formed the inner flanges, $e$.

What will be termed the "bottom plate" of the mold is designated by the letter C', and it is made with end and connecting recesses, $f$, and on its inside face is formed with the ribs $g$, and outside along one edge is formed with a lug, $c'$, to fit to the lug $c$, and with recesses $d'$, to fit the lips $d$.

What will be termed the "top plate" is designated by the letter $C^2$, and is flat on its inner and outer faces, and formed along one edge with recesses $d^2$, to fit the lips $d$.

What will be termed the "side plates" are designated by the letter $C^3$, and are made alike, each being formed at what will be termed the "upper end" with a recess, $h'$, to mold the side projecting edges of the top of the case, and at what will be termed the "lower end" with a recess having an outwardly-inclined face, $i$, and a face, $i'$, parallel with the inner face of the plate, and with angular shoulders $j$ and $j'$, to form the side moldings of the case, as illustrated in Fig. 1 of the drawings. These side plates will fit between the top and bottom plates, and will be formed with lugs $b'$, to fit the lugs $b$, and, in addition, with lugs $b^2$, to bear against the projecting portions of the top and bottom plates, as shown.

What will be termed the "back plate," $C^4$, is formed with lugs $k$, and has secured to its inner face, by means of dowel-pins, a frame, K, of the form shown in Fig. 4, the inner upper face of which is cut away on a curve, as shown at $l$, and which is also formed with lugs $b^3$, to bear against lugs $b^2$ and rest upon the edges of the side plates when the back plate is put in place. To the inner face of the back plate there is secured by means of dowel-pins a circular pattern, G', to mold the opening A'. A frame, M, is employed, composed of side plates, N, and an arched end plate, O, secured to the side plates by thumb-screws P.

In operating, the side, top, and face portions are clamped together by suitable clamps, Q. The inner sides of said plates are then faced with the first-described composition to the required thickness, say, a quarter of an inch. Then the face-plate is backed up with the second composition mentioned, to the face of the circular pattern G. Then the frame M is placed in position with its arched end resting on the circular pattern, and its other end supported by pins $m$, projecting from its side plates and resting on the ends of the ribs $g$, the said ribs serving to hold the frame against lateral displacement. Then the spaces between the side, top, and bottom plates and the frame M are filled and tamped with the second composition. Next the back portion of the case is removed from the back-plate mold, in which it has been allowed to remain long enough to "set," and placed on the composition in the mold, so as to form the back of the case, a portion of the moist composition being applied to the meeting surfaces to connect the same together if they are not moist enough for the purpose. The back portion is removed from the back-plate mold by first taking off the plate $C^4$, then the frame K, and next knocking out the central pattern, G'.

The composition in the back plate and that in the mold being moist and plastic, when the parts are brought together a firm union is effected between the meeting faces of the composition, and after the material is set sufficiently, say, from twelve to fifteen hours, and the several parts of the mold removed from the cast, there will appear a case in one single piece ready for finishing, as first hereinbefore described.

It will be observed that the several parts of the mold, including the patterns, are all separable from each other, which admits of their being detached without injuring the cast.

Some of the parts which I have described as separable may, however, be made inseparable from other parts when such can be done without injury to the cast.

The mold illustrated has been described with minuteness; but because such is the case I do not wish to be understood as restricting myself to the exact form of the parts described, as the form may be varied almost without limit, as may also the number and design of the patterns used.

I have given the proportions of the ingredients in the composition and compound which I have found best adapted to the uses made of them; but I do not wish to confine myself to the exact proportions, as they may be varied and changed.

The composition may of course be used for other purposes than the manufacture of clock-cases, although it is particularly well adapted to such use. For instance, it may be used in manufacturing statuary, vases, and other articles.

Having thus described my invention, what I claim is—

1. The composition herein described, composed of Keene's cement, rosin, and alum, or its described equivalents, substantially as described.

2. The composition herein described, composed of Keene's cement, rosin, alum, or its described equivalent, and a coloring-matter, substantially as described.

3. The composition herein described for dyeing artificial marble, &c., consisting of extract of logwood, copperas, tincture of iron, and water, as set forth.

4. The method herein described of manufacturing clock-cases and other articles, consisting in combining Keene's cement, rosin, alum, or its equivalent, and a coloring-matter, and then molding the same into the desired article, then honing the article, subsequently dyeing the same, and afterward finishing its surface, substantially as described.

5. The method herein described of making clock-cases and other articles, consisting in grinding Keene's cement and then mixing it in water with rosin and alum, or its equivalent, subsequently adding coloring-matter thereto, then adding more cement, then molding the same, and honing the surface of the article, afterward subjecting the same to the action of a hot dye, and subsequently polishing the surface.

6. A clock-case made in a single piece from a composition composed of Keene's cement, rosin, alum, or its described equivalent, and a coloring-matter, substantially as described.

7. The mold composed of the separable back, side, top, and bottom plates, in combination with the detachable circular patterns and inner frame, substantially as described.

8. In a mold for clock-cases, the combination, with the side plates thereof, of the detachable back plate provided with the detachable frame and circular pattern-plate, substantially as described.

9. In a mold for clock-cases, the combination, with the side plates thereof, of face and back-plates provided with patterns for forming an opening in the face and back of the case, substantially as described.

In testimony whereof I affix my signature in presence of two witnesses.

REESE P. COUGHLIN.

Witnesses:
JOS. L. COOMBS,
EWELL A. DICK.